June 5, 1934.  P. J. FITZGERALD  1,962,008
PORTABLE ELECTRIC MIXER
Filed July 14, 1932
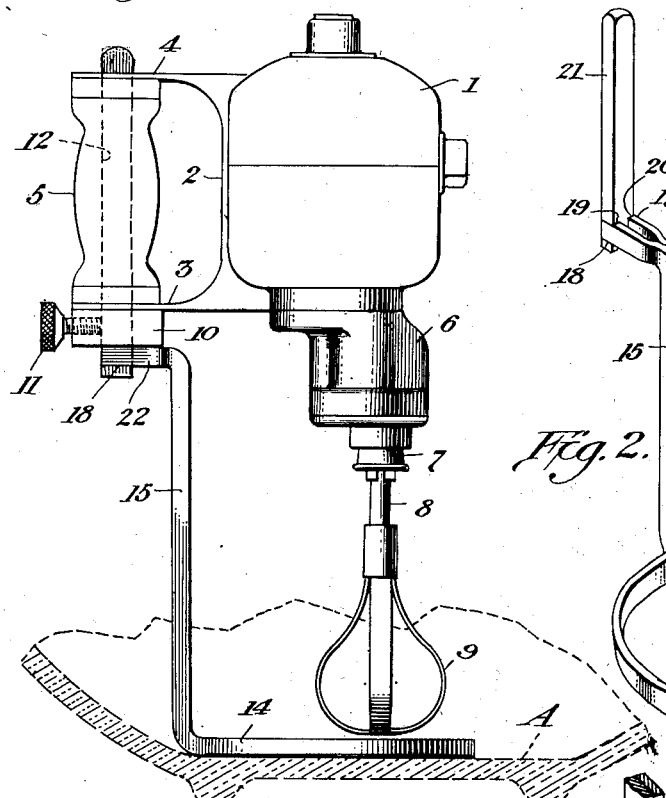
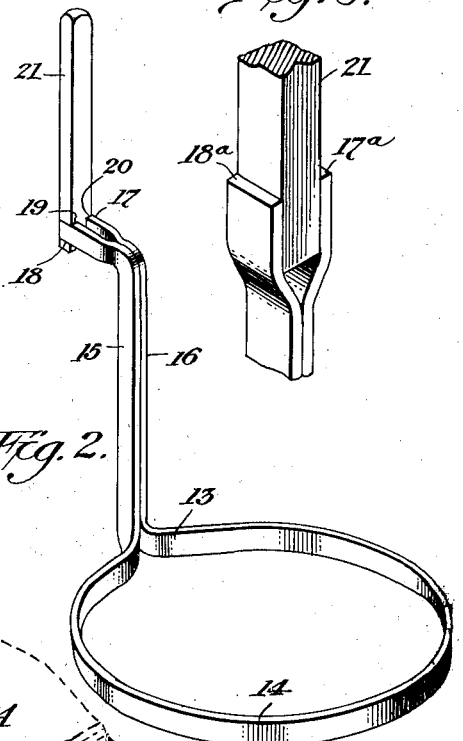
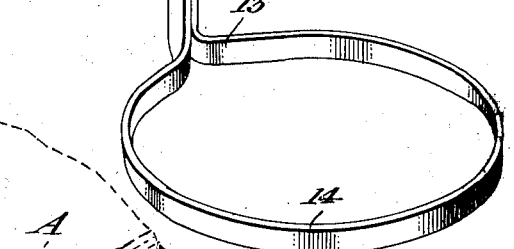
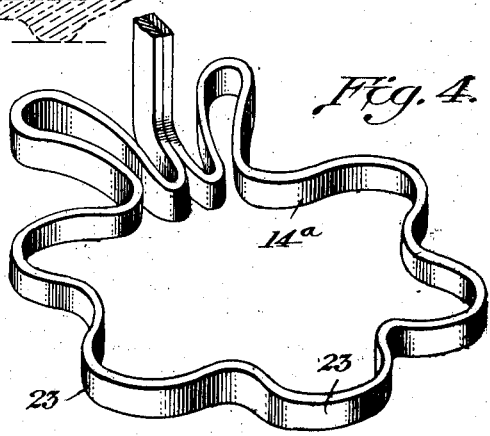
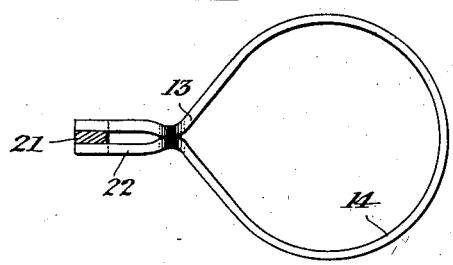
Inventor,
Patrick J. Fitzgerald.
By Sturtevant, Mason & Porter
Attorneys Patented June 5, 1934

1,962,008

UNITED STATES PATENT OFFICE 1,962,008

PORTABLE ELECTRIC MIXER

Patrick J. Fitzgerald, Torrington, Conn., assignor to The Fitzgerald Mfg. Company, Torrington, Conn., a corporation of Connecticut Application July 14, 1932, Serial No. 622,509

4 Claims. (Cl. 259—135)

This invention relates to improvements in portable electric mixing devices, and more particularly to an improved stand therefor.

The principal object of the invention is to provide a portable electric mixing unit including a stand wherein the electric motor is adjustably mounted on the stand.

A further object of the invention is to provide an electric mixing device, of the class referred to, which is adapted to be inserted as a unit within any suitable mixing receptacle.

A still further object of the invention is to provide a stand for an electric mixing device whereby the device will remain in an upright position within the mixing receptacle.

The invention still further provides a stand for an electric mixing device whereby the mixing tools are prevented from coming in contact with the mixing receptacle when the stand and mixing device are inserted as a unit within the mixing receptacle.

A still further object of the invention is to provide an electric mixing unit including a stand which is adapted to be easily manipulated by hand whereby the mixing tools may be directed around the edge of the mixing receptacle.

A still further object of the invention is to provide a portable electric mixing unit which is cheaply manufactured, easily manipulated by hand and thoroughly efficient.

In the drawing:—

Figure 1 is a view of the assembled mixing device placed within a receptacle.

Fig. 2 is a view showing the improved stand.

Fig. 3 is a top plan view of the stand.

Fig. 4 shows a modified form of base for the stand.

Fig. 5 shows a modified form of securing the stand to the bar.

The invention will now be briefly described. An electric motor is secured to a bracket which has a handle secured between the arms thereof. The motor has associated therewith the usual clamping devices in which are secured the mixing tools to be driven by said motor. The handle and bracket arms have rectangular openings through which a rectangular bar is adapted to fit. A set screw affords means for securing the arm in any position desired. A stand formed of a single piece of metal is bent to form a right-angled loop portion which serves as a supporting base. The upright arms of the stand are secured to the bar in such a manner that a stop is formed so that the motor and bracket are prevented from falling below a certain point whereby the mixing tools are likewise prevented from descending below the loop portion of the stand and in this manner the mixing tools will not come in contact with the mixing receptacle when the assembled unit is placed within the receptacle. It is thus apparent that the stand serves as a rest for the mixing device and also a gauge for setting the mixing tools at any desired height above the loop base.

The mixing device has an electric motor 1 which is secured to a bracket 2 having the usual bracket arms 3, 4 between which is secured a handle 5. A housing 6 secured to the motor encloses the reduction gears and carries one or more clamping devices 7 within which the stem 8 of suitable mixing tools 9 are clamped. Secured to one of the bracket arms is a cylindrical member 10 which has a threaded opening to receive the set screw 11. A rectangular opening 12 extends through the cylindrical member 10, the bracket arms 3, 4 and the handle 5.

A stand 13 is preferably made from a single piece of metal bent to form a horizontal loop portion 14 which serves as a base for the mixing device and as a guard to prevent the mixing tools from coming in contact with the mixing receptacle. The arms 15, 16 of the stand extend vertically upward from the base 14 and may be welded or otherwise held together. The free ends 17, 18 of the stand are bent at right angles to the upright arms 15, 16 and are slightly separated so that they will fit within grooves 19, 20 in a vertical bar 21 to which they are welded or otherwise secured.

The vertical bar 21 fits within the opening 12 so that the base or loop portion 14 of the stand is approximately located centrally below the center of gravity of the mixing device whereby the same will remain in equilibrium. Since the ends 17, 18 of the stand are bent at right angles, a horizontal portion 22 is formed at the upper end of the arms 15, 16. This horizontal portion affords a rest for the bracket arm 3 and serves to prevent the mixing tools from descending below the base 14 so that they will not come in contact with the mixing receptacle A.

Figures 4 and 5 show slight modifications. In Figure 4, the base or loop portion 14ᵃ is provided with a series of convolutions 23 to render the mixing device more stable when left in an upright position. In Figure 5, the ends 17ᵃ, 18ᵃ are not bent at right angles to the upright arms 15, 16 but are offset a sufficient amount to extend over the sides of the vertical bar 21 to which they are welded. The ends 17ᵃ, 18ᵃ thus afford a stop to prevent the mixing tools from descending below the base or loop portion.

In operation, the mixing unit, as shown in Figure 1, is placed within a receptacle A. The operator may hold the device by the handle 5 when the motor is turned on. Likewise, the operator may direct the mixing tools around the edge of the receptacle when it is so desired. The mixing unit may be left momentarily in the receptacle without the necessity of removing the same or turning off the motor, because the stand will support the device in an upright position with no danger of its turning over. It is, likewise, apparent that the base or loop portion 14 of the stand will serve as a guard to prevent the mixing tools 9 from coming in contact with the mixing receptacle at all times.

It is obvious that minor changes in the details of construction and arrangement of parts may be made without departing from the spirit of the invention as set forth in the appended claims.

Having thus fully described my invention, what I claim as new and desire to secure by Letters Patent, is:—

1. A stand for a motor driven mixing device consisting of one piece of metal bent to provide a supporting loop or base in a horizontal plane with the ends of said loop approximated and joined and extending upwardly from the plane of the loop and having a horizontal fork at its upper end with a vertical standard rising therefrom on which the motor bracket may be adjusted.

2. A stand for a motor driven mixing device consisting of a metal member bent to form a supporting loop in a horizontal plane, the ends of said loop being approximated and joined and extending upwardly from the plane of said loop and having a forked end, and a vertical standard secured to said forked end and adapted to support the mixing device.

3. A stand for a motor driven mixing device consisting of a metal member bent to form a supporting loop in a horizontal plane, said loop being provided with a series of convolutions and having the ends joined and extending upwardly from the plane of said loop and provided with a forked end at the top thereof, and a vertical standard secured to said forked end and adapted to support the mixing device.

4. In a portable mixing unit, a motor, mixing tools driven thereby, a bracket secured to said motor, and a stand connected to said bracket and adapted to support the unit in an upright position, said stand consisting of a metal member bent to form a horizontal supporting loop, the ends of said loop approximating one another and extending upwardly from the plane of said loop and having an offset forked upper end and a vertical standard secured to the forked end of said metal member with the offset portion thereof extending beyond the sides of said vertical standard whereby to provide a stop to prevent the motor bracket from descending therebelow.

PATRICK J. FITZGERALD.